Dec. 19, 1939.   H. N. FAIRBANKS   2,183,529
MAGAZINE EJECTOR
Filed Jan. 19, 1938
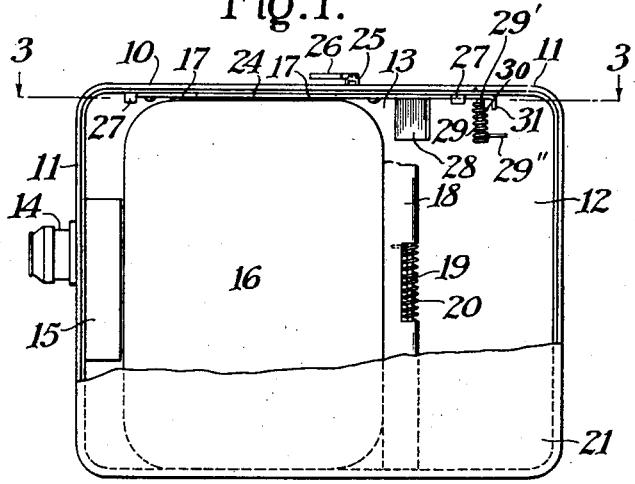
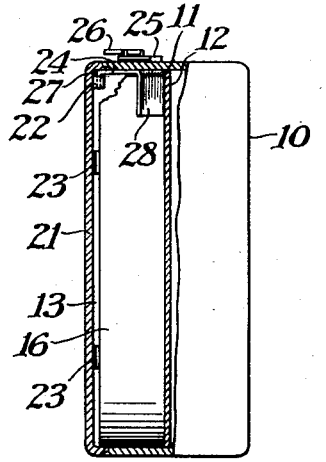
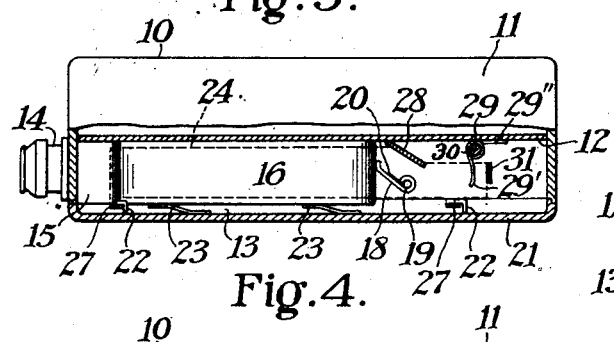
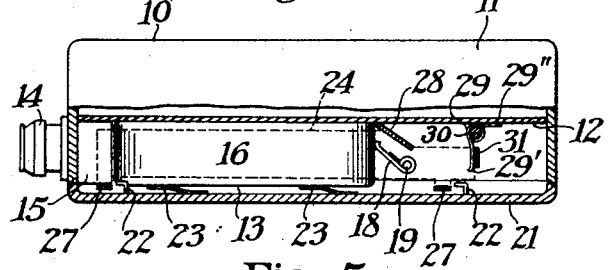
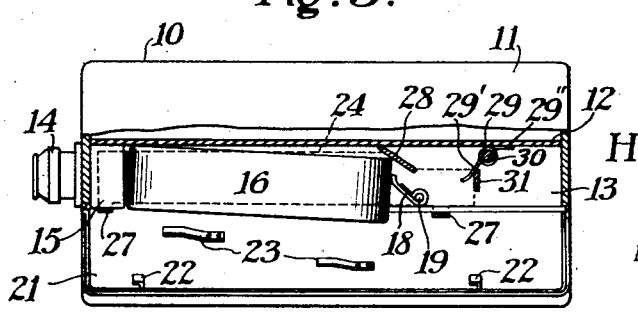
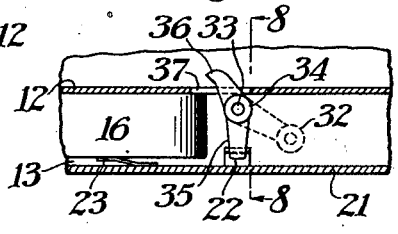
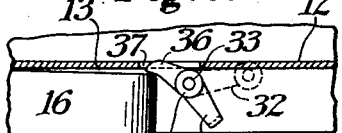
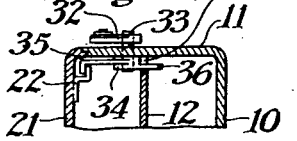
Henry N. Fairbanks
INVENTOR
BY
ATTORNEYS Patented Dec. 19, 1939

2,183,529

UNITED STATES PATENT OFFICE 2,183,529

MAGAZINE EJECTORS

Henry N. Fairbanks, Rochester, N. Y., assignor to Eastman Kodak Company, Rochester, N. Y., a corporation of New Jersey Application January 19, 1938, Serial No. 185,706
In Germany January 20, 1937

7 Claims. (Cl. 88—17)

The present invention relates to ejecting means for film magazines and more particularly to ejecting means movably mounted on the casing of the photographic apparatus and operated by the locking means for fastening a cover to said casing.

Heretofore, magazine ejectors have been normally operative to eject the magazine from the magazine chamber or have been operated for such ejection by the cover for the casing of the apparatus. Such forms of magazine ejectors are under certain conditions undesirable because such ejectors either interfere with proper positioning of the magazine when the casing cover is open or else prohibit final positioning of the magazine until the casing cover has been closed.

The primary object of the present invention is the provision of an ejecting means for a film magazine which is operated by the locking means for fastening the cover to the casing of the apparatus.

A further object of the invention is the provision of an ejecting means which is not necessarily operated by opening the cover for the casing of the apparatus but which may optionally be operated by the latching means for ejecting movement of a magazine with respect to the magazine chamber.

A further object of the invention is the provision in a photographic apparatus of the magazine type having a magazine chamber and a cover for enclosing the same, of an ejecting means and a resilient means operatively connected thereto and operative normally to maintain said ejecting means out of its ejecting position.

Other and further objects of the invention will be apparent to those skilled in the art from the disclosure which follows.

The above and other objects of the invention are embodied in a photographic apparatus of the magazine type including a casing providing a chamber in which a film magazine may be positioned, a cover for enclosing said chamber and a locking means movably mounted on said casing for movement into a locking position to fasten said cover to said casing and alternatively movable to an ejecting position, in combination with an ejecting means which is connected to said locking means and movable by said locking means in said magazine chamber into an operative position corresponding to the ejecting position of the locking means for displacing the magazine with respect to the magazine chamber and for removal therefrom. More specifically, the ejecting means may be normally maintained in an inoperative position by a resilient means and the locking means may comprise a slidable locking bar on which an inclined ejector member is mounted on a rotatable locking member on which an ejecting projection is carried.

Reference is hereby made to the accompanying drawing wherein similar reference characters designate similar elements and wherein:

Fig. 1 is a side elevation of a magazine type of photographic apparatus, a portion of the apparatus cover being broken away for better illustration of the preferred form of the ejecting means, according to the invention.

Fig. 2 is a rear elevation of a photographic apparatus in partial section also to illustrate the preferred form of the ejecting means.

Fig. 3 is a top elevation with a partial section taken on the line 3—3 of Fig. 1 and illustrating the locking means for the casing and cover in locking position.

Fig. 4 is also a top elevation in partial section of the photographic apparatus illustrating the locking means in intermediate position.

Fig. 5 is a top elevation in partial section of the photographic apparatus illustrating the ejecting means in ejecting position and the resilient means acting to return the ejecting means to inoperative position.

Fig. 6 is a partial transverse section of the photographic apparatus showing a modified form of locking and ejecting means in locking position and Fig. 7 is a similar view showing the locking means in open position and the ejecting means in operative position.

Fig. 8 is a partial section taken on the line 8—8 of Fig. 6 and showing other details of the modified form of locking means and ejecting means.

Although the invention is described and shown as applied to a motion picture camera of the magazine type, it should be clearly understood that the invention is equally applicable to other types of photographic apparatus of the magazine type.

In the illustrated embodiment of the invention, the photographic apparatus comprises a casing 10 having edge walls 11 and an internal mechanism plate 12 forming one side of a magazine chamber 13 provided in said casing 10. A photographic objective 14 is attached to the front edge wall 11 of casing 10 in registry with a shutter and film advancing mechanism, not shown, but enclosed within housing 15.

The film magazine 16 may be of any conventional or standard design and is preferably in the form of a rectangular container with rounded corners. Said film magazine may be positioned within the magazine chamber 13 by means of locating members such as a pair of studs 17 and a back member 18 pivoted on a rod 19 by a coil spring 20 to resiliently move and hold said magazine 16 in proper position against the housing 15.

A cover 21 is associated with casing 10 and may be hinged to or fitted onto said casing 10 to enclose the magazine chamber 13. Said cover 21 carries a plurality of hooks 22 for engagement with the locking means to be described and also carries a plurality of springs 23 for engaging and positioning the film magazine when said cover 21 is fastened in closed position.

According to the preferred form of the invention the locking means comprises a locking bar 24 slidably mounted on the inner side of upper edge wall 11 and adapted to be operated by a bracket 25 attached to locking bar 24 and extending through said upper edge wall 11 and a finger piece 26 pivoted to said bracket 25. Said locking bar 24 carries a pair of ears 27 which are adapted in locking position of the locking means or locking bar 24 to engage the hooks 22 on cover 21 and hold said cover 21 in closed position. Such closed and locking position of the locking means and locking bar 24 is illustrated in Fig. 3.

The ejecting means, in its preferred form comprises an inclined member 28 attached to locking bar 24 and preferably made integral therewith. Said inclined member 28 is movable in magazine chamber 13 from the inoperative position shown in Fig. 3, in which the locking means is in locking positon, and the inoperative position shown in Fig. 4, in which the locking means is in an intermediate and unlocked position, into an operative position illustrated in Fig. 5, wherein said inclined member 28 engages the film magazine 16 and displaces the same with respect to the magazine chamber 13 so that said film magazine 16 may be readily removed from the magazine chamber.

In order to prevent the ejecting means or inclined member 28 from remaining in an operative position and interfering with replacement of the same or another film magazine 16, a resilient means is operatively associated with said ejecting means to return it normally from operative position into an inoperative position. Such a resilient means may compriste a coil spring 29 mounted upon a post 30 and having one end 29'' bearing against the mechanism plate 12 and having the other end 29' extending into the path of a lug 31 on locking bar 24. It will be noted from Fig. 3 that the end 29' of spring 29 is displaced from lug 31 when the locking means is in locked position and merely engages lug 31 when the locking means is in intermediate position, see Fig. 4. However, when the locking means and ejecting means have been moved to operative position, as shown in Fig. 5, the spring end 29' and coil spring 29 are placed under tension and act to urge the locking bar 24 to its intermediate position as soon as the finger piece 26 has been released by the operator. As a result, the ejecting means is normally in inoperative position so as not to interfere with insertion of the film magazine 16.

A modified form of the invention is illustrated in Figs. 6 to 8, inclusive, and comprises a locking member rotatably mounted in the upper edge wall 11. Specifically, such rotatable locking member may comprise an external finger member 32 fastened to a stem 33 which extends through said edge wall 11 and carrying on its inner end a bell crank lever 34. The bell crank 34 has a locking arm 35 adapted to engage a hook 22 on the cover 21 in locking position of finger member 32; see Fig. 6. Bell crank lever 34 also includes an ejecting projection 36 which during locking position of the locking arm 35 extends through the slot 37 of mechanism plate 12 but which upon movement of the locking arm 35 into locking position moves into the magazine chamber 13 and engages the film magazine 16 to displace the same with respect to magazine chamber 13 for removal therefrom.

Consequently, the present invention in its broadest aspect relates to an ejecting means operated and/or carried by a locking means on the casing and for displacing a film magazine with respect to its magazine chamber prior to removal therefrom. Another outstanding feature of the invention is the provision of the resilient means for normally maintaining the ejecting means in inoperative position, see Figs. 1 to 5, inclusive. Since many modifications of the ejecting means are conceivable, the present invention is not to be limited to the forms illustrated herein but is to be accorded the scope defined by the following claims.

Having now particularly described my invention what I desire to secured by Letters Patent of the United States and what I claim is:

1. In a photographic apparatus of the magazine type, the combination with a casing providing a chamber in which a film magazine may be positioned, a cover associated with said casing for enclosing said chamber, and a locking means movably mounted on said casing, movable into a locking position to fasten said cover to said casing, and alternatively movable to an ejecting position, of an ejecting means connected to said locking means and movable thereby in said chamber into an operative position corresponding to the ejecting position of said locking means for displacing said magazine with respect to said chamber for removal therefrom.

2. In a photographic apparatus of the magazine type, the combination with a casing providing a chamber in which a film magazine may be positioned, a cover associated with said casing for enclosing said chamber, and a locking member movably mounted on said casing, movable into a locking position to fasten said cover to said casing, and alternatively movable to an ejecting positon, of an ejecting member carried by said locking member and movable in said chamber into an operative position corresponding to the ejecting position of said locking member for displacing said magazine with respect to said chamber for removal therefrom.

3. In a photographic apparatus of the magazine type, the combination with a casing providing a chamber in which a film magazine may be positioned, a cover associated with said casing for enclosing said chamber, and a locking bar slidably mounted on said casing, slidable in one direction into a locking position to fasten said cover to said casing, and slidable in the opposite direction into an ejecting position, of an ejecting member attached to said locking bar and movable in said chamber into an operative position corresponding to the ejecting position of said locking bar for displacing said magazine with respect to said chamber for removal therefrom.

4. In a photographic apparatus of the magazine type, the combination with a casing providing a chamber in which a film magazine may be positioned, a cover associated with said casing for enclosing said chamber, and a locking bar slidably mounted on said casing, slidable in one direction into a locking position to fasten said cover to said casing, and slidable in the opposite direction into an ejecting position, of an inclined member attached to said locking bar and movable in said chamber into an operative position corresponding to the ejecting position of said locking bar for displacing said magazine with respect to said chamber for removal therefrom.

5. In a photographic apparatus of the magazine type, the combination with a casing providing a chamber in which a film magazine may be positioned, a cover associated with said casing for enclosing said chamber, and a locking means for fastening said casing and cover to each other, of an ejecting means connected to said locking means and movable thereby in said chamber into an operative position for ejecting movement of a film magazine with respect to said chamber, and a resilient means operatively associated with said ejecting means and for normally maintaining the same in inoperative position.

6. In a photographic apparatus of the magazine type, the combination with a casing providing a chamber in which a film magazine may be positioned, a cover associated with said casing for enclosing said chamber, and a locking means for fastening said casing and cover to each other, of an ejecting means carried by said locking means, movable therewith and within said chamber into an operative position for ejecting movement of a film magazine with respect to said chamber, and a resilient means operatively associated with said ejecting means and for normally maintaining the same in inoperative position.

7. In a photographic apparatus of the magazine type, the combination with a casing providing a chamber in which a film magazine may be positioned, a cover associated with said casing for enclosing said chamber, and a locking member rotatably mounted on said casing, rotatable in one direction into a locking position to fasten said cover to said casing, and rotatable in the opposite direction into an ejecting position, of a projection attached to said locking member and movable into said chamber into an operative position corresponding to the ejecting position of said locking member for engaging and displacing said magazine with respect to said chamber for removal therefrom.

HENRY N. FAIRBANKS.